US008413920B2

(12) United States Patent
Solberg et al.

(10) Patent No.: US 8,413,920 B2
(45) Date of Patent: Apr. 9, 2013

(54) METHOD AND APPARATUS FOR UNWINDING A ROLL OF WEB MATERIAL

(75) Inventors: Bruce Jerome Solberg, Green Bay, WI (US); David Kent Mattheis, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1974 days.

(21) Appl. No.: 10/461,321

(22) Filed: Jun. 13, 2003

(65) Prior Publication Data
US 2004/0251370 A1 Dec. 16, 2004

(51) Int. Cl.
*B65H 23/24* (2006.01)

(52) U.S. Cl.
USPC .................. 242/615.11; 242/615.12

(58) Field of Classification Search ........ 242/420.6, 242/420.5, 563, 566, 615.11, 615.12, 413.5–413.6; 226/44–45, 26, 97.3
See application file for complete search history.

(56) References Cited

U.S. PATENT DOCUMENTS

| | | | |
|---|---|---|---|
| 3,201,985 A | 8/1965 | Williams | |
| 3,312,415 A | 4/1967 | Jeans | |
| 3,327,916 A * | 6/1967 | Weidenhammer et al. | 242/615.11 |
| 3,379,390 A | 4/1968 | Eastcott | |
| 3,398,870 A * | 8/1968 | Mullan et al. | 242/615.11 |
| 3,950,988 A | 4/1976 | Nowisch et al. | |
| 4,043,495 A | 8/1977 | Sander | |
| 4,109,520 A | 8/1978 | Eriksson | |
| 4,197,972 A * | 4/1980 | Daane | 242/615.12 |
| 4,461,432 A | 7/1984 | Hutzenlaub | |
| 4,492,328 A | 1/1985 | Münnich et al. | |
| 4,790,468 A * | 12/1988 | Nakashima et al. | 242/615.11 |
| 5,020,381 A | 6/1991 | Bartlett | |
| 5,052,233 A | 10/1991 | Rantala | |
| 5,092,059 A | 3/1992 | Wimberger et al. | |
| 5,370,289 A | 12/1994 | Helms | |
| 5,452,834 A | 9/1995 | Mariotti et al. | |
| 5,480,085 A | 1/1996 | Smithe et al. | |
| 5,480,086 A * | 1/1996 | Nakashima et al. | 242/615.11 |
| 5,520,317 A | 5/1996 | Eckert et al. | |
| 5,558,263 A | 9/1996 | Long | |
| 5,671,895 A | 9/1997 | Cederholm et al. | |
| 5,709,352 A * | 1/1998 | Rogers et al. | 242/417.1 |
| 5,709,389 A | 1/1998 | Algers et al. | |
| 5,775,623 A | 7/1998 | Long | |
| 5,837,910 A | 11/1998 | Beijbom et al. | |
| 5,891,309 A | 4/1999 | Page et al. | |

(Continued)

FOREIGN PATENT DOCUMENTS

| | | |
|---|---|---|
| DE | 11 87 096 | 2/1965 |
| DE | 43 01 618 | 5/1994 |

*Primary Examiner* — Sang Kim
(74) *Attorney, Agent, or Firm* — Peter D. Meyer

(57) ABSTRACT

An apparatus and method for unwinding a roll of web material are disclosed herein. The web material is unwound from the roll and the machine direction of motion of the web is altered without creating a problematic span of web material. A value analogous to the tension of the web material is determined. The speed of the web is adjusted according to the analog of the tension of the web. The apparatus can comprise an unwind stand to rotate the roll, and a means for altering the direction of travel of the web material. The apparatus further comprises a means to determine an analog of the web material tension and a means of controlling the speed of the web according to the analog of the web tension. The web material is routed to a downstream process.

18 Claims, 5 Drawing Sheets

U.S. PATENT DOCUMENTS

| | | |
|---|---|---|
| 5,967,457 A | 10/1999 | Wildenberg et al. |
| 5,970,627 A | 10/1999 | Stenz et al. |
| 5,979,731 A | 11/1999 | Long et al. |
| 6,004,432 A | 12/1999 | Page et al. |
| 6,030,496 A | 2/2000 | Baggot et al. |
| 6,325,896 B1 | 12/2001 | Hultcrantz et al. |
| 6,328,852 B1 * | 12/2001 | McGary et al. ............... 162/199 |
| 6,374,247 B1 | 4/2002 | Gebauer |
| 6,375,801 B2 * | 4/2002 | McGary et al. ............... 162/199 |
| 6,397,495 B1 | 6/2002 | Doherty et al. |
| 6,481,275 B1 | 11/2002 | Koivukunnas et al. |
| 6,505,792 B1 * | 1/2003 | Rocheleau et al. ....... 242/615.12 |
| 6,651,923 B2 * | 11/2003 | Kinnunen et al. .......... 242/532.2 |
| 2002/0005264 A1 | 1/2002 | McGary et al. |

* cited by examiner

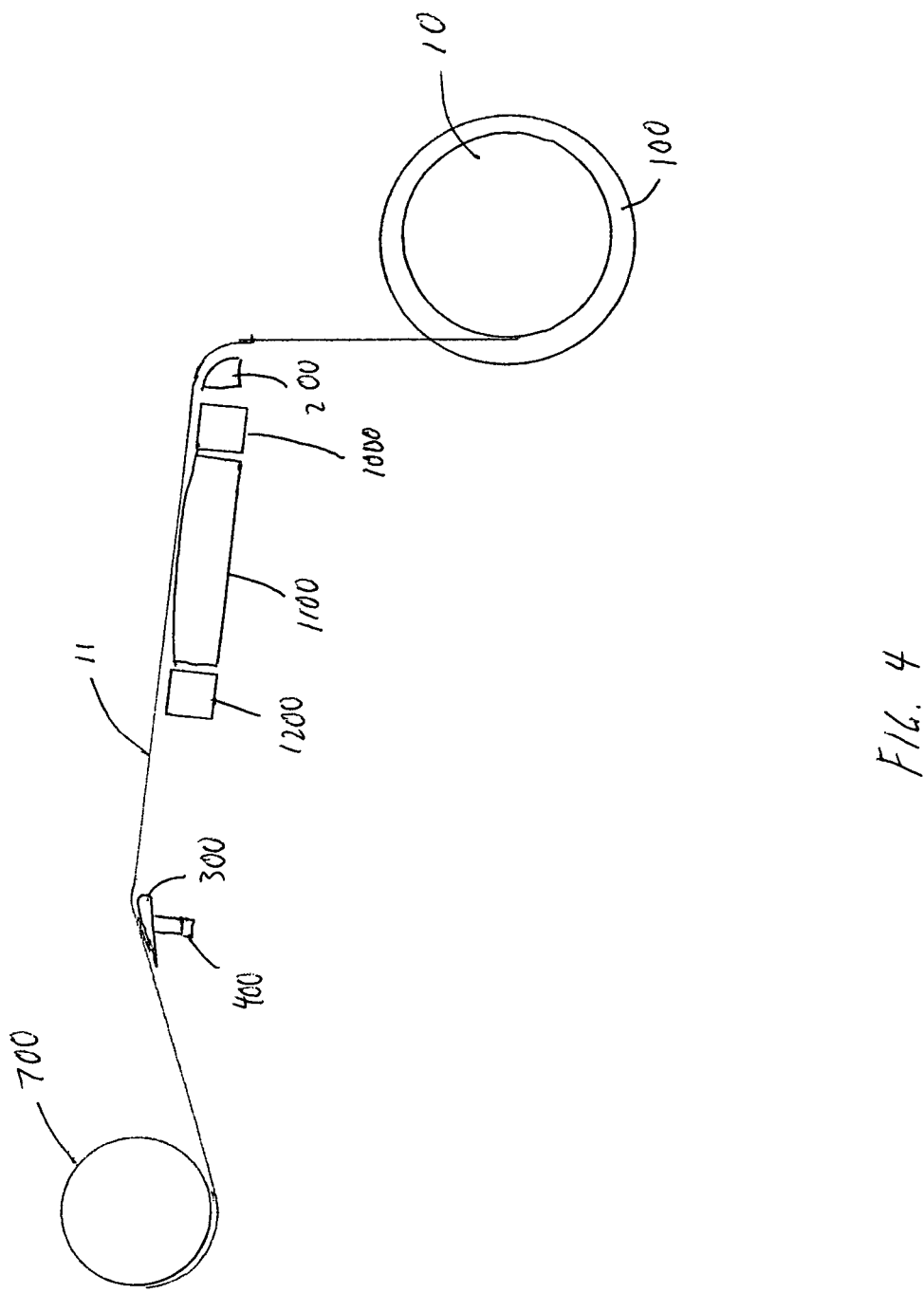

METHOD AND APPARATUS FOR UNWINDING A ROLL OF WEB MATERIAL

FIELD OF THE INVENTION

This invention relates to methods and apparatuses for the unwinding of web material. More particularly, the invention relates to methods and apparatuses for the unwinding of tissue paper webs.

BACKGROUND OF THE INVENTION

Web materials are well known. These materials are generally planar with a thickness much smaller than the other dimensions of the material. Handling these materials during manufacturing processes presents unique challenges. Flexible web materials that are easily damaged, such as thin foils, tissue papers and the like, are particularly challenging. Wound webs, and particularly wound stretchable webs, can have fluctuations in the wound web tension throughout the length of the web. These fluctuations can be problematic as the web is unwound and transported by processing equipment in the conversion of large rolls of web material into finished products. Fluctuations in web tension can result in wrinkled or broken webs resulting in a loss of quality and/or productivity. Similarly, the velocity of a web unwinding from an out-of-round roll fluctuates over the course of each revolution due to fluctuations in the roll diameter.

Previous efforts have focused on the use of mechanical dancer systems to compensate for tension and web velocity fluctuations. These systems involve web-contacting parts that interact inertially with the web. The interaction of the webs and dancer system parts includes the transfer of energy from the web to the dancer, and from the dancer to the web. These energy transfers can create web handing problems such as web breaks and web wrinkles.

It is desired to provide a method and apparatus to facilitate the unwinding of web materials while reducing the impact of fluctuations in the wound tension of the web and also reducing the impact of the velocity fluctuations caused by rolls that are out-of-round.

SUMMARY OF THE INVENTION

An apparatus for unwinding a roll of web material and a method for the use of the apparatus are disclosed herein. In one embodiment the apparatus comprises an unwind stand for rotating the roll of web material, and a perforated air conveyance to alter the direction of motion of the web without contacting the web. The apparatus further comprises a tension-sensing element adapted to detect changes in the tension of the moving web, and a data processing system adapted to determine a web tension analog value according to the output of the tension-sensing element. The apparatus further comprises a downstream process adapted to receive the web, as the web is unwound from the roll, and a controller adapted to alter the speed of the web according to the web-tension analog value.

In one embodiment the roll is rotated to unwind the web material. The web material is routed around the perforated air conveyance to alter the direction of motion of the web. A web-tension analog value is determined for the web. The web is routed to a downstream process. The speed of the web is adjusted according to the web-tension analog value.

BRIEF DESCRIPTION OF THE DRAWINGS

FIG. 4 is a schematic plan view of an embodiment of the apparatus of the invention wherein the roll of web material is oriented vertically.

DETAILED DESCRIPTION OF THE INVENTION

Figure 1:
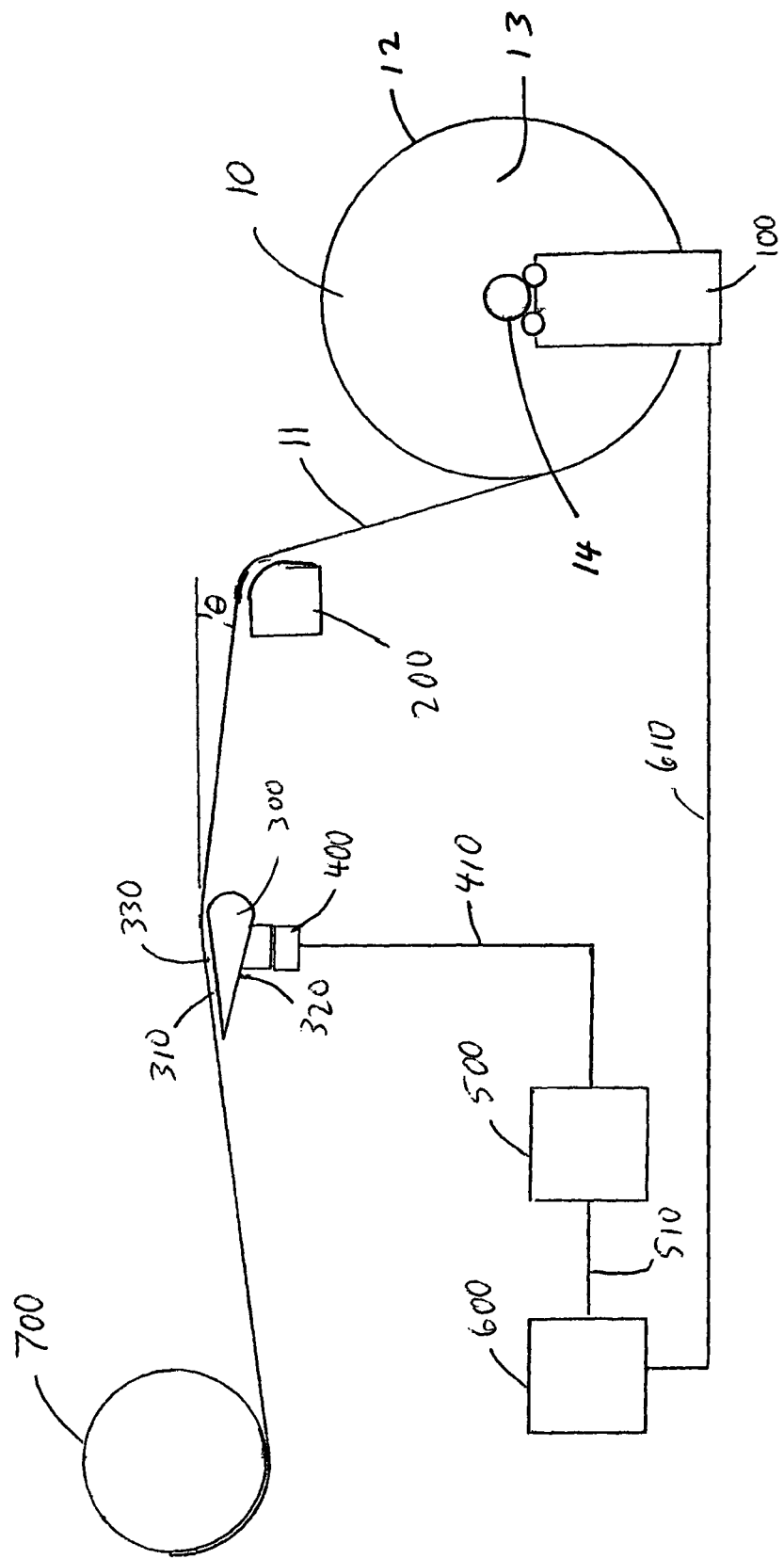
FIG. 1 is a schematic side view of an embodiment of the apparatus of the invention.

According to FIG. 1, a roll 10, is rotated by unwind stand 100. The roll 10 comprises a convolutely wound web material 11. The rotation of the roll 10 unwinds the web material 11. The roll 10 has a circumferential surface 12, and two end surfaces 13. The roll 10 may be wound around a central core 14, or may be coreless. The unwind stand 100 may be adapted to drive the circumferential surface 12 of the roll 10, the core 14 of the roll 10, one or more of the end surfaces 13 of the roll 10, or a combination of these. The unwind stand 100 may be adapted to rotate the roll 10 with the unwind axis of the roll 10 oriented horizontally, or with the unwind axis oriented vertically.

As shown in FIG. 1, the web 11 is routed from the roll 10 around a perforated air conveyance, such as an air bar 200, to alter the machine direction of motion of the web 11. The air bar 200 is disposed transverse to the machine direction of the web 11 and preferably extends at least across the entire width of the web 11. The machine direction of the web 11 is the direction parallel to the path of the web 11 through the processing machinery. The perforations within the air bar 200 can extend across only a portion of the width of the web 11, or across the full width of the web 11, or beyond the full width of the web 11. Perforated air conveyances are well known in the art of web handling. The air bar 200 can have perforations that direct air to produce forces in the web 11 that are transverse to the machine direction of the web 11. These perforations direct air radially away from the surface of the air bar 200 as well as transverse to the machine direction of the web 11. Transverse forces are utilized to spread the web 11 across the width of the air bar 200 and to help control and stabilize the web 11. The air bar 200 can also be configured to support the web 11 without transverse forces by only incorporating perforations that direct air radially away from the surface of the air bar 200, and not transverse to the machine direction of the web 11.

As shown in FIG. 1, the web 11 is routed from the air bar 200 to a tension-sensing element, such as an idler roller (not shown) or an airfoil 300. The web 11 is routed around the tension-sensing element. The tension-sensing element is disposed transverse to the machine direction of the web 11. The machine direction of the web 11 is the direction parallel to the path of the web 11 through the processing machinery. The cross-machine direction of the web 11 is the direction perpendicular to the machine direction. The tension-sensing element preferably extends at least across the full width of the web 11. As the web 11 moves in the machine direction past the tension-sensing element, the forces working on the tension-sensing element fluctuate. Such fluctuations in force on the tension-sensing element are detectable as a reaction of the tension-sensing element. The tension-sensing element reacts to the motion of the web 11. The reaction of the tension-sensing element varies according to changes in the tension of the web 11.

The tension-sensing element can be an idler roller coupled with a load cell. Exemplary idlers roller can be fabricated from graphite composites and lightweight end hubs. An idler roller is wrapped by the web 11 and rotates with the motion of the web 11. The web 11 applies a force to the idler roller and the force is detected by a sensor coupled to the roller. When the web 11 begins to move, there is a drag force between the web 11 and the idler roller until the inertia of the idler roller is overcome and the roller begins to turn with the web 11. Similarly, when the web 11 slows or stops the inertia of the moving idler roller results in a drag force imparted to the web 11 that is moving at a different speed than the roller. In each of these circumstances, the forces generated by the interaction of the web with the roller can be sufficient to break, or damage, the web 11.

As shown in FIG. 1, the airfoil 300 comprises a web-facing surface 310, which is curved in the machine direction of the web. The web 11 is routed around the airfoil 300, and wraps at least a portion of the airfoil 300 at a wrap angle θ. The wrap angle must be greater than 0° for the airfoil 300 to react to the web 11. The maximum wrap angle is determined by the capability of the moving web 11 to generate an aerodynamic lift force as the web 11 moves past the airfoil 300. If sufficient lift force is not generated, the web 11 will remain in contact with the airfoil 300. Wrap angles in excess of 90° are possible. In one embodiment, the wrap angle θ of the web 11 can be from about 5° to about 60°. In another embodiment, the wrap angle θ can be from about 10° to about 45°. In another embodiment, the wrap angle θ can be from about 15° to about 35°. Wrap angles greater than 35° are less desirable due to an increased likelihood of a stall condition wherein a sudden loss of a substantial portion of the aerodynamic lift force occurs. Wrap angles less than 5° do not provide sufficient lift force to create a detectable reaction in the airfoil 300.

A boundary layer of air 330 in proximity to the moving web 11 moves with the web 11 in the machine direction. The boundary layer of air 330 interacts with the web-facing surface 310 of the airfoil 300 generating an aerodynamic lift force that lifts the web 11 away from the airfoil 300. When the motion of the web 11 creates sufficient lift force to lift the web 11 away from the airfoil 300, the web 11 moves in the machine direction and wraps the airfoil 300 but does not contact the airfoil 300.

As the web 11 is unwound, respective portions of the length of the web 11 pass sequentially by the airfoil 300. The tension of the respective portions of the web 11 can vary throughout the roll of web material (not shown). The variation in web tension is reflected in lift force changes to the airfoil 300 as translated to the airfoil 300 via the boundary air layer 330. Without being bound by theory, Applicants believe that the airfoil 300 is coupled to the web 11 by the boundary layer of air 330 between the web 11 and the airfoil 300. As web portions of varying tension pass the airfoil 300, the airfoil 300 reacts to changes in the web tension via the boundary layer of air 330, which influences the lift forces impacting the airfoil 300. The reaction of the airfoil 300 is proportional to the changes in the tension of the web 11. One or more sensors 400 are capable of detecting the reaction of the airfoil 300 to the lift force changes. The tension of the web 11 can be measured without contacting the web 11 by processing the output of one or more sensors 400 capable of detecting the reaction of the airfoil 300 to the changes in the tension of the web 11. The airfoil 300 is coupled to the sensor 400 by mounting element 200. The sensor or sensors can detect the reaction of the airfoil 300 to the entire width of the web 11. It is possible to detect the tension in lightweight tissue webs moving with relatively low levels of web tension since the sensor is indirectly detecting the aggregate tension of the web rather than a localized web tension via the lift force changes acting on the airfoil 300.

In one embodiment the airfoil 300 comprises a static airfoil. A static airfoil reacts to the web tension changes as described above. At low web speeds, (less than 1100 ft/min [335 m/min]) a tissue paper web does not create sufficient lift forces to move the web 11 from contact with the airfoil 300. At these speeds, the web 11 is in contact with the airfoil 300 and a drag force of about 3 lbs (13.34 N) is generated between the web 11 with a width of about 101 inches (2.56 m) and the airfoil 300. At production speeds in excess of 1100 feet/min (335 m/min), there is a drag force generated between the web 11 and the airfoil 300 of around 1.75 lbs (7.784 N) for a web with a 101-inch (2.56 m) width, at a wrap angle of 45° to 60°.

In an alternative embodiment the airfoil 300 comprises an active airfoil. An exemplary active airfoil is the active PathMaster™ available from MEGTEC Systems, of DePere Wis. The active airfoil provides a supplemental source of air to augment the boundary layer of air 330 moving with the web 11. The use of an active airfoil can offset the drag force generated between the web 11 and the airfoil 300 that is present when the static foil is used. The active airfoil reacts to changes in the tension of the web 11 as described above.

In yet another embodiment, the airfoil 300 comprises a circular foil and provides the additional function of altering the path of the web 11. This airfoil 300 may be used to reorient the web 11 more than 90° from a first direction to a second direction. This embodiment may be used to achieve desired web routing as the web 11 is unwound from the roll (not shown).

The sensor 400 can be selected to sense any reaction of the airfoil 300 to the changes in the tension of web 11. Exemplary sensors include, but are not limited to, accelerometers, velocimeters, displacement sensors, strain gauges and load cells. An exemplary accelerometer in the model 797A accelerometer available from Wilkoxon Research Inc., of Gaithersburg, Md. An exemplary velocimeter is the model 797V velocimeter available from Wilkoxon Research Inc., of Gaithersburg, Md. The model 797A or Model 797V may also be used as displacement sensors by appropriately processing the sensor output. An exemplary load cell is the PressDuctor™ mini PTFL301E available from ABB USA, Norwalk, Conn. The following discussion of the use of the sensor 400 is in terms of a single sensor 400 although the invention is not limited to the use of a single sensor.

The sensor 400 has a principle axis along which axis the sensor can detect changes to the airfoil 300. The angle between the web 11 and the principle axis determines the proportion of the web tension that acts upon the airfoil 300 in a detectable manner. This angle is determined by the wrap angle θ of the web 11 and the geometry of the installed sensor 400.

The exemplary load cell described above requires the use of a low-lateral-force floating mount system for the airfoil 300. The load cell may not respond accurately when forces off the principle axis of the load cell act upon it. The axis of the cell may be oriented in the machine direction of the web 11, alternatively the axis of the load cell may be oriented at an angle to the machine and cross-machine directions of the web material path. The deflection of the airfoil 300 in the cross machine direction due to the weight of the airfoil 300 may produce off-axis loading of the load cell. The low-lateral-force floating mounting system compensates for cross-machine direction deflections and reduces the off-axis loading of the load cell. Mounting the airfoil 300 on gimbals provides a low-lateral-force floating mount. The gimbals in the mounting system provide pivot points for the mounting brackets of the airfoil 300 on the axis of the load cell. The deflection of the airfoil 300 in the cross machine direction causes the mounting clamps to pivot on the gimbals without the corresponding deflection forces being transferred to, and detected by, the load cell.

The output of the sensor 400 can be transmitted to a data processing system 500 via a communication link 410. The communication link 410 may be of any form that will satisfactorily transmit the output signal from the sensor 400 to the data processing system 500. Exemplary communication links 410 include without limitation, wireless links such as the BlueLynx™ wireless link available from Wilcoxon research, Gaithersburg, Md., or hard wiring between the sensor and the data processing system 500. The communication link 410 may provide for the transmission of the output of a single sensor 400 in an analog or digital format, or may provide for the multiplexed transmission of the outputs of multiple sensors 400.

The data processing system 500 determines a web tension analog value according to the reaction of the airfoil 300 to changes in tension in the moving web 11 that are sensed by the sensor 400. The web tension analog value is so named because the value is analogous to the web tension. The web tension analog value may be generated as either an analog or digital signal. The web tension analog value determined by the data processing system 500 can be the actual tension of the web 11. Alternatively, the web tension analog value can be directly proportional to the actual web tension, and offset from the actual web tension value. Either form of the web-tension analog value described above may be used to control the web handling process. An exemplary data processing systems the ABB PFEA111, available from ABB USA, Norwalk, Conn.

The output of the sensor 400 may be provided to the data processing system 500 as a signal varying in voltage, or current. The data processing system 500 may be configured to detect the changes in the sensor 400 output and to determine a web tension analog value according to those changes. The algorithm of the data processing system 500 will depend upon the type of sensor 400 and the specific details of the sensor model as well as the wrap angle θ of the web 11 and the orientation of the sensor's principle axis.

The output of the data processing system 500 can be communicated to a drive controller 600 via a second communication link 510. This communication link 510 may be across the backplane of a programmable controller components rack, it may be hard wired; it may be a wireless communication. Beyond the nature of the transmission means, the communications may be of an analog signal or may be a digital signal. The signal may be for a single output or the multiplexed combination of a plurality of outputs. The drive controller 600 is adapted to adjust the speed of the web to achieve the desired web tension.

According to FIG. 1, the tension in the paper web 11 is controlled by the speed difference between the speed of the unwind stand 100, and the downstream process drive 700. This speed difference may be altered by adjusting the output of drive controller 600 to raise or lower the speed of the unwind stand 100. Raising the speed of the unwind stand 100 relative to the downstream process drive 700 will reduce the tension of the web 11, and lowering the speed of the unwind stand 100 relative to the downstream process drive 700 will increase the tension of the web 11.

The output of the drive controller 600 is adjusted according to an error signal and the gains of the drive controller 600. The error signal, a proportional gain and an instantaneous integral gain are used in the drive controller correction calculation to adjust the drive controller output to reduce the magnitude of the error signal as is known in the art.

In one embodiment, the invention determines the instantaneous integral gain of the drive controller 600 according to a velocity analog value of the web 11. This step results in effective web-tension control over the entire speed range of the web converting process. The step also accommodates variations in the modulus of elasticity of the web 11, or the wound tension of the web 11.

This embodiment may be practiced using any drive controller 600 that uses the integral of a value derived from the error signal to derive the controller output correction. An exemplary drive controller 600 for practicing the method of the invention is a Universal Drive Controller card, in a Reliance Automax Distributed Control System available from Reliance Electric, Mayfield Heights, Ohio.

A tension set point, correlated to the desired tension, is determined for the process. The value of the set point is input into the drive controller 600. The web tension used to determine the error signal may be measured at any point in the process where tension is being controlled. Web tension can be measured as described above. The error signal is then determined as the difference between the tension set point, and the measured tension.

In one embodiment, the instantaneous integral gain is determined using a maximum integral gain and the web velocity analog value. The web velocity analog value is analogous to the actual web velocity. The actual value may be either in an analog or digital format. Maximum integral gain is calculated according to the ratio of the maximum speed of the process and the span of the controlled segment of the process. The maximum integral gain used in the tuning calculation may be based on either the ratio of maximum speed to span length or the reciprocal of this ratio, depending upon the specific units of integration used in the drive controller 600. The instantaneous integral gain then varies according to the ratio of the web velocity analog value and the maximum speed set point.

In another embodiment, the instantaneous integral gain is determined according to the web velocity analog value and the span of the process segment, without consideration of the maximum process speed or the maximum integral gain. The instantaneous integral gain used in the drive controller correction calculation may be based on either the ratio of the web velocity analog value to the process span length or the reciprocal of this ratio, depending upon the specific units of integration used in the drive controller 600.

The web velocity analog value may be set equal to a master speed reference used to synchronize speeds in the web handling process. Alternatively, the web velocity analog value may be derived from measuring the web velocity. When the web velocity is measured, the web velocity analog value may be set equal to the instantaneous value of the web velocity or to a mathematically filtered value of the velocity. A filtered value reduces the effects of sudden changes in the velocity upon the web velocity analog value and the tension control process. The instantaneous value of the web velocity may be filtered through the use of mathematical smoothing functions as are known in the art.

As the velocity of the web 11 changes, the value of the instantaneous integral gain is recalculated and the drive controller 600 utilizes the new value of the instantaneous integral gain to determine the correction in the drive controller output necessary to reduce the tension error value.

Particular drive controller hardware and/or software may limit the lowest velocity analog value for which an instantaneous integral gain is calculated. The value of the lower limit is determined according to the specific details of the controlled process. In one embodiment the instantaneous integral gain value is fixed at any web velocity analog value less than 1% of the maximum process speed. In another embodiment the integral gain value is fixed at any web velocity analog value less than 0.1% of the maximum process speed. The speed at which the lower limit of the instantaneous integral gain is determined is not limited to the above mentioned embodiments. The lower limit speed may be any speed less than the maximum speed of the process. A lower limit instantaneous integral gain is determined for a selected lower limit web velocity analog value. The lower limit instantaneous integral gain is then used at any web velocity analog value less than or equal to the lower limit web velocity analog value.

Adjusting the instantaneous integral gain according to changes in the web velocity analog value provides rapidly responding, stable tension control over the full speed range of a process. In one embodiment, the method of the invention uses the proportional gain of the drive controller 600 to accommodate changes in process conditions. As an example, the adverse impact on web tension caused by an out-of-round roll of web may be reduced through the adjustment of the proportional gain. The proportional gain may be set to a high value at low speeds and then reduced according to changes in the web speed to reduce the undesirable effects caused by an out-of-round roll of web. In another embodiment, the proportional gain is selected to provide an adequate response across the process speed range and left unchanged.

The web 11 proceeds from the tension-sensing element, to a downstream process. Exemplary downstream processes include, but are not limited to, web combiners, embossers, printers, folders, and slitters. The web 11 is passed to the downstream process via a downstream process drive 700.

In one embodiment, the web 11 proceeds from the roll 10 to the downstream process drive 700 without contacting any surface in between the two. Because the web 11 proceeds over a considerable distance without contacting a surface, velocity fluctuations in the web 11 due to the roll 10 being out-of-round are reduced.

Figure 3:
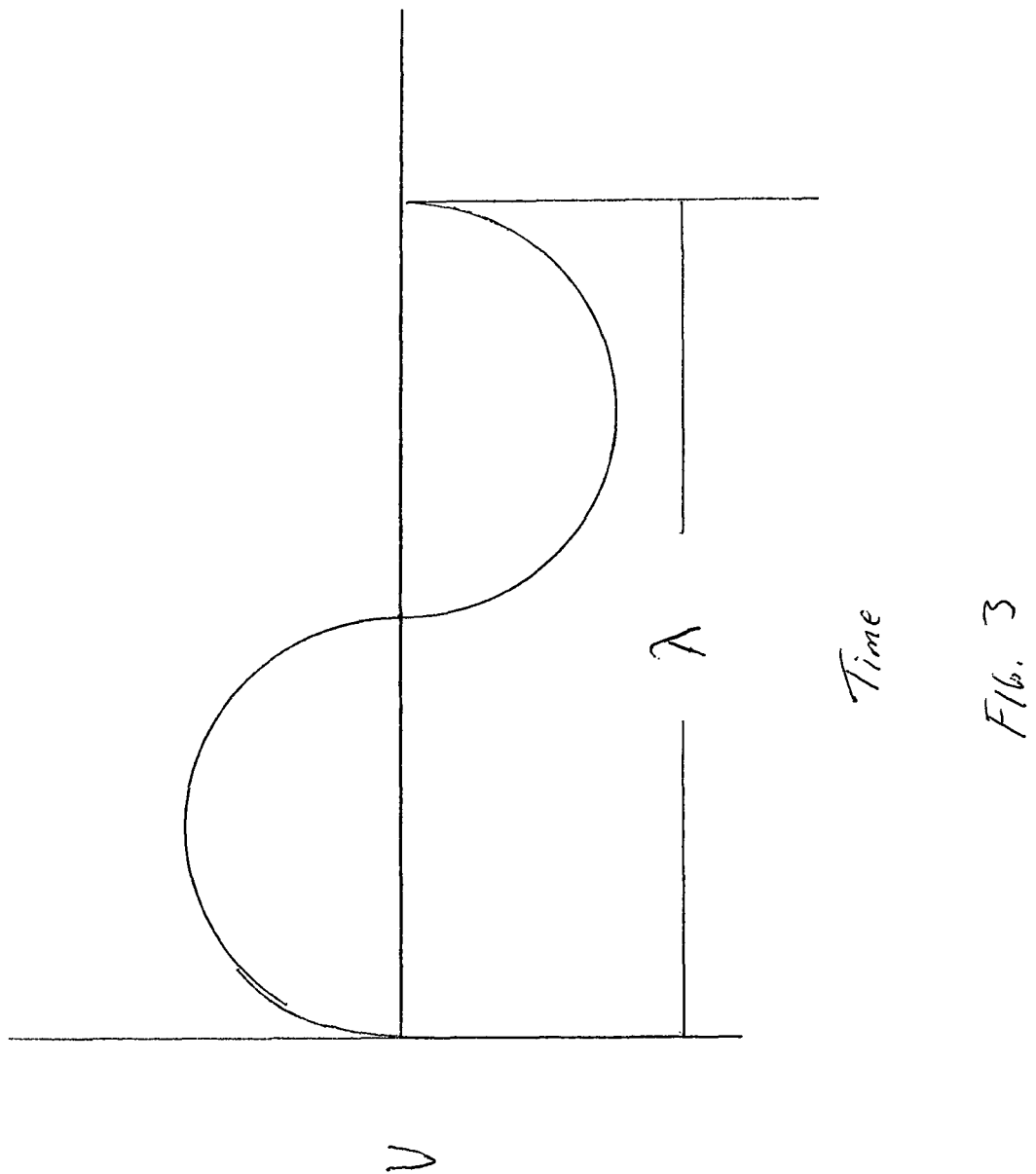
FIG. 3 is a graphical representation of the web velocity fluctuation as a function of roll circumferential position.

Without being bound by theory, Applicants believe that the absence of web-contacting surfaces precludes the formation of a web span until the web 11 is passed to the downstream process drive 700. The velocity of the web 11 can be represented as a sinusoidal waveform with a wavelength λ, corresponding to the circumference of the roll 10 and velocity amplitude fluctuations V, varying according to the extent to which the roll is out-of-round. As shown in FIG. 3, the velocity V of the web 11 will increase, reach a peak value, then decrease to a minimum value and then return to the initial value over the course of each revolution of the roll 10. The out of round roll geometry can cause the length of the first process span to change in addition to creating velocity fluctuations.

The fluctuations in web velocity V result in energy transfers between the web 11 and the web-contacting surface. These energy transfers can result in web breaks, web wrinkles, edge curling and other undesirable conditions. To compensate for such conditions, web-handling systems are operated at reduced speeds. The magnitude of these energy transfers is greater in a web-handing system having a first web contact point at a distance less than the wavelength λ of the web 11 from the roll 10. In this system, each fluctuation in the web velocity results in an energy transfer between the web and the web-contacting surface.

Using the apparatus and method of the invention, the distance between the roll 10 and the first web-contacting surface can be greater than the wavelength λ of the roll 10. Because this distance is greater than the wavelength λ of the roll 10, the positive and negative velocity fluctuations occurring in a given revolution of the roll 10 are capable of combining and canceling each other out. This results in a reduced degree of web velocity fluctuation as the roll 10 is unwound.

For example, the airfoil 300 used to sense the web tension is coupled to the web 11 by the viscous drag of the boundary layer of air 330, but does not contact the web 11 once the boundary layer of air 300 is established between the web 11 and the airfoil 300. The viscous coupling of the airfoil 300 with the web 11 promotes the combination of the velocity fluctuations and the corresponding reduction of the magnitude of these fluctuations. The coupling of the web 11 to the airfoil 300 is insufficient to create a process span. A static airfoil, when used, acts on the web with a small drag force proportional to the velocity of the web.

Including additional web stabilizing elements along the web path can increase the distance between the roll 10 and the first web-contacting surface. In one embodiment illustrated in FIG. 2a, a combination of an active airfoil 1000 and a vacuum system 1200 is incorporated beside the web 11. The active airfoil 1000 and vacuum system 1200 are disposed downstream from the air bar 200. The active airfoil 1000 provides a stabilizing influence for the moving web 11 to increase the reliability of the transport of the web 11. The vacuum system 1200 removes air from the boundary layer to reduce the turbulence of the boundary layer 330 and thereby promote the stable movement of the web 11.

Figure 2A:
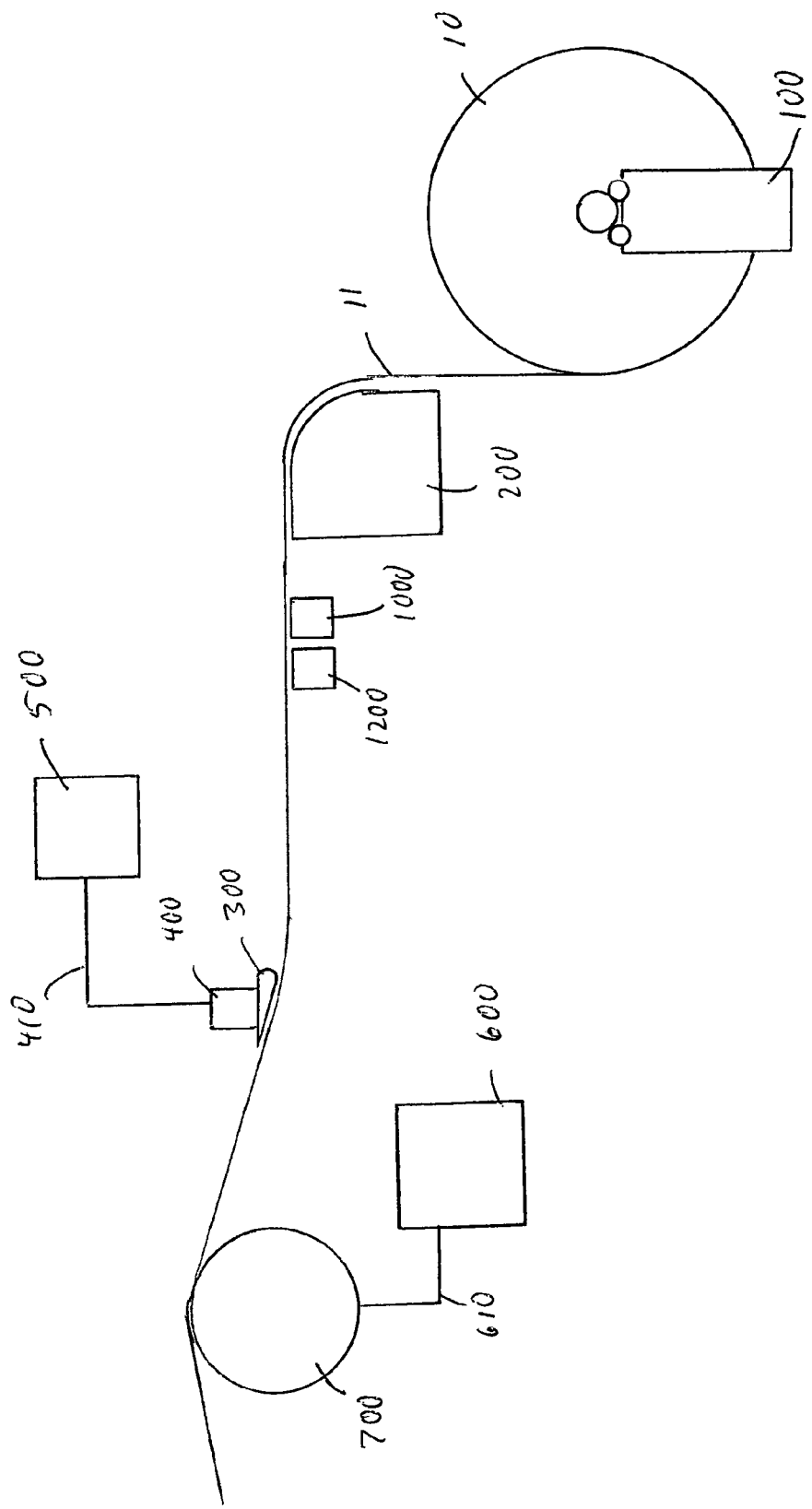
FIG. 2a is a schematic side view of a second embodiment of the apparatus of the invention.
Figure 2B:
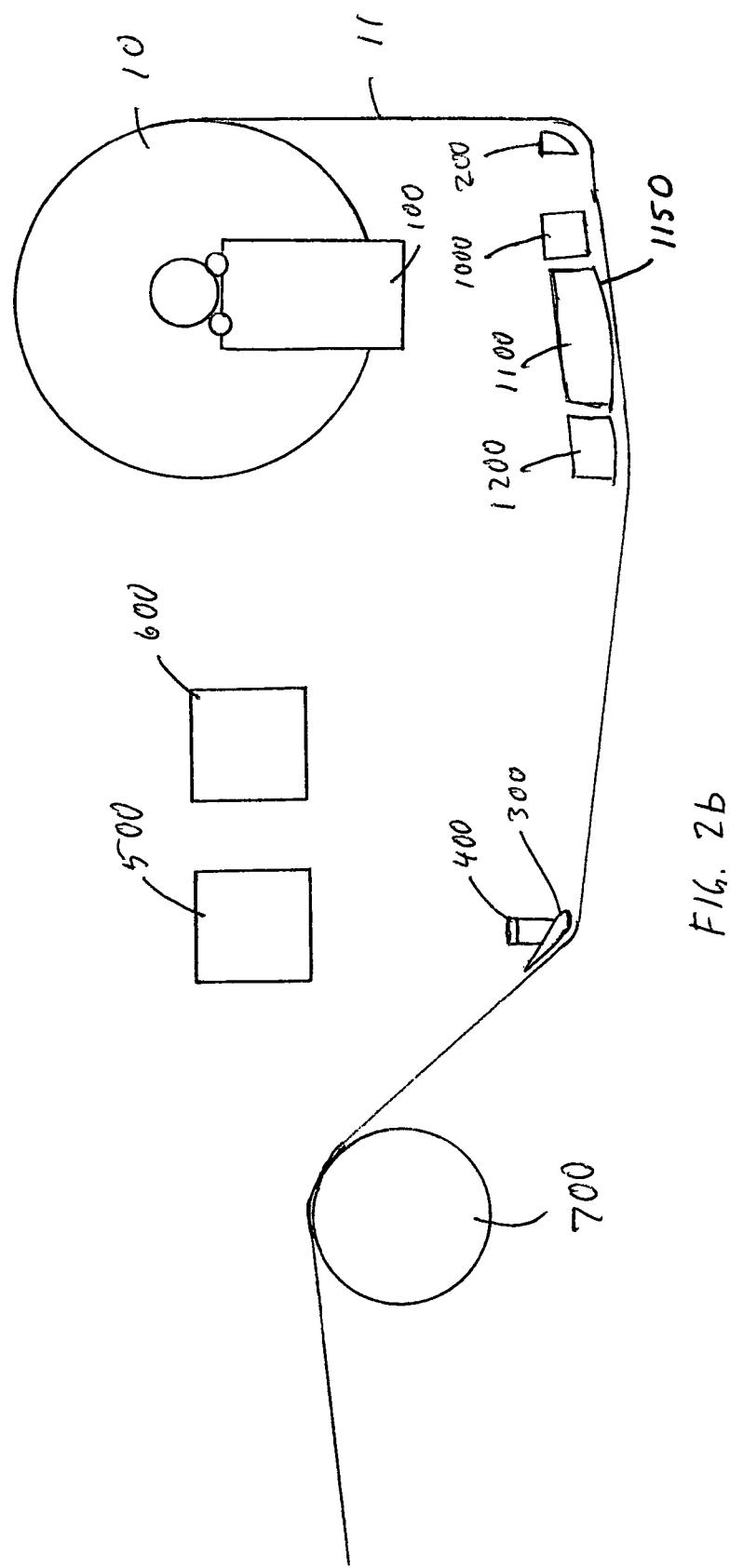
FIG. 2b is a schematic side view of a third embodiment of the apparatus of the invention.

In another embodiment, illustrated in FIG. 2b, a laminar flow airfoil section 1100, is incorporated into the web path between the active airfoil 1000 and the vacuum system 1200. The laminar flow airfoil section 1100 has a web-facing surface 1150 curved in the machine direction of the web. The laminar flow airfoil section 1100 promotes the laminar flow of the boundary layer air 330 along the curved web-facing surface 1150. The laminar flow of the boundary layer air 330 promotes the smooth transport of the web 11 along the laminar flow airfoil section 1100. The boundary layer air 330 can become turbulent as the air approaches the trailing edge of the laminar flow airfoil section 1100. The presence of the vacuum section 1200 after the laminar flow airfoil section 1100 allows for the removal of turbulent air from the boundary air layer 330 at the trailing edge of the laminar flow airfoil section 1100. The active airfoil 1000 augments the boundary layer air 330 as described above and can reduce the drag force between the web 11 and a static airfoil. In one embodiment the active airfoil 1000 eliminates the drag force between the airfoil 300 and the web 11.

Method of Use:

The apparatus described above can be used according to the following method to unwind a roll 10 of web material 11. The unwind stand 100 rotates the roll 10 and begins to unwind the roll 10 of web material 11. The web 11 is routed around the air bar 200 and the direction of motion of the web 11 is altered to redirect the web 11 toward the downstream process drive 700. The web 11 is routed around a tension-sensing element, such as an airfoil 300, whereby the tension of the web 11 is detected. The detected tension is processed by a data processing system 500 wherein a web-tension analog value is determined. The web-tension analog value is communicated to a drive controller 600. The drive controller 600 adjusts the output of either the unwind stand 100, the downstream process drive 700 or both, to control the tension of the web 11 according to a specified desired web tension. The web 11 then proceeds to the downstream process drive 700.

In another embodiment, as illustrated in FIG. 2a, the web 11 proceeds from the air bar 200, to an active airfoil 1000, then to a turbulence reducing system 1200. The web 11 then proceeds from the turbulence reducing system 1200 to the tension-sensing element. The web tension is measured as described above. The web 11 then proceeds to the downstream process drive 700.

In another embodiment, as illustrated in FIG. 2b, the web 11 proceeds from the active airfoil 1000, to a laminar flow airfoil 1100, then to the turbulence reducing system 1200, then to the tension-sensing element, whereby the web tension is detected and measured as described above. The web 11 is subsequently routed to the downstream process drive 700.

In any of the embodiments described above, the web tension may be measured without direct contact with the web 11. One means of making a tension measurement without contacting the web 11 is through the use of an airfoil 300 as described above.

In each method described above the web 11 may be spread and stabilized in the cross machine direction by using an air bar 200 adapted to apply a transverse force to the web 11. The web 11 may also be spread in the cross machine direction by an active airfoil 1000. The PathMaster™ active foil described above provides web-spreading functionality.

The apparatus and method herein described can be utilized in the handling of webs 11 having a horizontal or vertical orientation. The rolls 10 may be horizontal FIGS. 1, 2a, and 2b, or vertical, FIG. 4. The web 11 may be carried through the web-handling apparatus described above either in a horizontal plane FIGS. 1, 2a, and 2b or a vertical plane FIG. 4. Web 11 in a horizontal plane can be routed either above the web handling apparatus as illustrated in FIGS. 1 and 2a, or the web 11 may be routed beneath properly inverted web-handling apparatus as illustrated in FIG. 2b.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of unwinding a roll of web material, the method comprising steps of:
   a) rotating the roll to unwind the web material at a web material speed,
   b) routing the web material around a perforated air conveyance, whereby the machine direction of motion of the web material is altered,
   c) measuring a web-tension analog value for the web material according to a force acting upon a tension-sensing element said tension-sensing element being responsive to a boundary layer of air proximate to said web material as said web material passes proximate to said tension sensing element,
   d) determining a web velocity analog value,
   e) determining an instantaneous integral gain according to the web velocity analog value,
   f) adjusting the speed of the web according to the instantaneous integral gain, and,
   g) routing the web material to a downstream process.

2. The method according to claim 1 further comprising steps of:
   f) routing the web material over an active air foil,
   g) routing the web material over a turbulence-reducing element.

3. The method of claim 2 further comprising the step of:
   h) routing the web material around a laminar flow airfoil.

4. The method according to claim 2 wherein the turbulence-reducing element comprises a vacuum source.

5. The method according to claim 1 wherein the step of measuring the web-tension analog value of the web material comprises the step of routing the web material around an airfoil.

6. The method according to claim 1 wherein a force transverse to the machine direction of the web material is applied to the web material as it is routed around the perforated air conveyance.

7. The method according to claim 1 wherein the roll of web material is vertically oriented.

8. A method of unwinding a roll of web material, the method comprising steps of:
   a) rotating the roll to unwind the web material at a web material speed,
   b) reorienting the web material from a first machine direction to a second machine direction,
   c) measuring a web-tension analog value for the web material according to a force acting upon a tension-sensing element without contacting the web material said tension-sensing element being responsive to a boundary layer of air proximate to said web material as said web material passes proximate to said tension-sensing element,
   d) determining a web velocity analog value,
   e) determining an instantaneous integral gain according to the web velocity analog value, and,
   f) adjusting the speed of the web according to the instantaneous integral gain.

9. An apparatus for unwinding a roll of web material, the apparatus comprising:
   an unwind stand adapted to unwind the roll of web material at a web material speed and in a machine direction,
   a perforated air conveyance disposed transverse to the machine direction of the web material and in the path of the web material,
   a tension-sensing element disposed transverse to the machine direction of the web material and in the path of the web material,
   a data processing system adapted to determine a web-tension analog value according to a force acting upon the tension-sensing element said tension-sensing element being responsive to a boundary layer of air proximate to said web material as said web material passes proximate to said tension-sensing element, a web velocity analog value, and an instantaneous integral gain according to the web velocity analog value,
   a downstream process adapted to receive the web material, and
   a controller adapted to adjust the speed of the web material according to the instantaneous integral gain.

10. The apparatus according to claim 9 wherein the tension-sensing element comprises a force sensor.

11. The apparatus according to claim 9 wherein the tension-sensing element comprises an acceleration sensor.

12. The apparatus according to claim 9 wherein the tension-sensing element comprises a displacement sensor.

13. The apparatus according to claim 9 wherein the tension-sensing element comprises a velocity sensor.

14. The apparatus according to claim 9 wherein the roll is vertically oriented.

15. The apparatus according to claim 9 wherein the tension-sensing element comprises a static airfoil.

16. The apparatus according to claim 9 wherein the tension-sensing element comprises an active airfoil.

17. The apparatus according to claim 9 further comprising:
an active air foil juxtaposed with the perforated air conveyance and disposed transverse to the machine direction of the web material, and
a turbulence reducing element juxtaposed with the active airfoil and disposed transverse to the machine direction of the web material.

18. The apparatus according to claim 17 further comprising:
a laminar flow airfoil disposed downstream of the active airfoil, upstream of the turbulence reducing element, transverse to the machine direction of the web material, and in the path of the web material.

\* \* \* \* \*